(12) United States Patent
Mårtensson et al.

(10) Patent No.: US 7,305,189 B2
(45) Date of Patent: Dec. 4, 2007

(54) PHASE MODULATION FOR AN OPTICAL TRANSMISSION SYSTEM

(75) Inventors: Jonas Mårtensson, Stockholm (SE); Anders Berntson, Huddinge (SE); Marco Forzati, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 650 days.

(21) Appl. No.: 10/401,140

(22) Filed: Mar. 28, 2003

(65) Prior Publication Data

US 2003/0219259 A1 Nov. 27, 2003

Related U.S. Application Data

(60) Provisional application No. 60/372,108, filed on Apr. 15, 2002.

(51) Int. Cl.
*H04B 10/04* (2006.01)
(52) U.S. Cl. ............ 398/183; 398/187; 398/188
(58) Field of Classification Search ........ 398/145–150, 398/183, 186–188, 199
See application file for complete search history.

(56) References Cited

U.S. PATENT DOCUMENTS

| 5,526,162 | A |   | 6/1996  | Bergano ............... 359/181 |
| 5,946,119 | A | * | 8/1999  | Bergano et al. .......... 398/91 |
| 5,963,608 | A | * | 10/1999 | Casper et al. .......... 375/373 |
| 6,005,702 | A |   | 12/1999 | Suzuki et al. .......... 359/183 |
| 6,097,525 | A | * | 8/2000  | Ono et al. ............. 398/185 |
| 6,671,079 | B2| * | 12/2003 | Fuller et al. .......... 359/264 |
| 6,693,929 | B1| * | 2/2004  | Essiambre et al. ......... 372/26 |
| 2001/0055136 | A1 | * | 12/2001 | Horiuchi et al. ......... 359/135 |
| 2003/0002833 | A1 | * | 1/2003  | Futami et al. .......... 385/122 |

FOREIGN PATENT DOCUMENTS

| EP | 1 059 758 | 12/2000 |
| EP | 1 128 580 | 8/2001 |

OTHER PUBLICATIONS

Bergano, N.S., et al: "Bit-Synchronous Polarisation and Phase Modulation Scheme for Improving the Performance of Optical Amplifier Transmission Systems," Electronics Letters, IEE Stevanage, GB, vol. 32, No. 1, Jan. 4, 1996, pp. 52-54 XP006004552.
R. Ohhira et al., "*Novel RZ signal format with alternate-chirp for suppression of nonlinear degradation in 40 Gb/s based WDM*", NEC Corporation, Computer & Communication Media Research, WM2, pp. 1-3, 2001.

\* cited by examiner

*Primary Examiner*—Dzung Tran
(74) *Attorney, Agent, or Firm*—Nixon & Vanderhye P.C.

(57) ABSTRACT

A data modulation apparatus is proposed that includes a data modulator (20) for modulating data onto an optical signal at a predetermined bit rate. The resulting encoded optical signal is phase modulated by a phase modulator (50) that is driven by at least one waveform of a frequency that is 1/n of the predetermined bit rate, where n is an integer greater than 2. The application of a phase modulation at a frequency of a third or less of the bit rate of a digital data signal increases the non-linear tolerance of a transmission system by reducing the effect of non-linear pulse-to-pulse interactions. Moreover, this increase in non-linear tolerance is significantly better than that obtained by a phase modulation at one half of the data bit rate, while the implementation of a phase modulator at this lower frequency reduces the complexity of the transmitter.

23 Claims, 5 Drawing Sheets

PHASE MODULATION FOR AN OPTICAL TRANSMISSION SYSTEM

This application claims priority from U.S. Provisional Application No. 60/372,108, filed Apr. 15, 2002, the entire content of which is hereby incorporated by reference in this application.

FIELD OF INVENTION

The invention relates to optical transmission systems and particularly to a phase modulation scheme for reducing non-linear intra-channel interactions in both single- and multi-channel optical transmission systems.

BACKGROUND ART

Optical wavelength division multiplexed transmission systems currently operate at 10 Gbit/s and below. However, the growing demand for capacity in terrestrial transmission systems and the prevailing desire to save or at least conserve current wavelength resources and simplify network management make increasing the channel rate to around 40 Gbit/s an attractive proposition. At increased bit rate a number of effect that limit system performance become more significant. These effects include chromatic dispersion, non-linearity, polarization mode dispersion (PMD) and amplified spontaneous emission (ASE). This attendant increase in noise requires an increase in channel bit rate to be accompanied by a linear increase in power to return the same signal-to-noise ratio (SNR). However, the non-linear effects become more severe as the power is increased. The optimum signal power is thus generally viewed as a trade-off between non-linearity and SNR. One of the dominating non-linear effects for high bit rates of 40 Gbit/s is that due to the interaction of overlapping pulses. At these higher bit rates the fibre dispersion causes the pulses to spread rapidly and while the average dispersion can be limited to close to zero by using dispersion-compensating fibre (DCF), the pulse energy will be spread over many bit-slots during most of the transmission. Non-linear pulse-to-pulse interactions take the form of intra-channel four-wave mixing (IFWM), wherein two or more wavelengths within the same channel interact to create a new wavelength causing amplitude variations, and intra-channel cross-phase modulation (IXPM), wherein several different wavelengths can cause each other to spread out resulting in timing jitter.

In most of the current optical WDM systems operating at 10 Gbit/s and below, the modulation format used is non-return-to-zero (NRZ). However, it has been suggested that the return-to-zero (RZ) modulation format is better suited for higher bit rate applications. While the RZ format requires more complex transmitters it has a higher tolerance to non-linear effects. Several schemes have been proposed for improve transmission performance by increasing the non-linear tolerance using phase modulation. U.S. Pat. No. 5,526,162 suggests increasing the non-linear tolerance by broadening the signal spectrum. This is achieved by modulating the phase of a NRZ optical data signal synchronously with the bit rate. U.S. Pat. No. 5,946,119 and U.S. Pat. No. 6,005,702 suggest the same form of modulation applied to a RZ optical data signal. When the phase of a RZ signal is modulated synchronously with the bit rate by a sinusoidal waveform the resulting modulation format is referred to as chirped RZ (CRZ). EP 1 059 758 proposes an alternative scheme, wherein a phase modulation is introduced that is synchronised with half the bit rate. This is referred to as carrier-suppressed RZ (CS-RZ) modulation and is achieved by shifting the phase between RZ pulses in adjacent bit slots by an odd integer of $\pi$. The resulting scheme has a higher non-linear tolerance than conventional RZ or NRZ. A further phase modulation format is described in R. Ohira et al., "Novel RZ signal format with alternate-chirp for suppression of non-linear degradation in 40 Gbit/s based WDM", Proceedings of OFC 2001, paper WM2, (2001). In this format a signal is phase modulated using a sinusoidal signal at a first frequency, filtered using a narrow band filter to extract the carrier and first double-side-band components and then data encoded with a RZ modulator at a frequency twice the phase modulation frequency. The resulting modulation, termed alternate chirp, has a non-linear tolerance similar to chirped RZ but with the narrow spectrum of CS-RZ.

Of the known modulation schemes described above chirped return-to-zero modulation (CRZ) provides the best non-linear tolerance. However, this is at the expense of a broadened spectrum, which brings with it the problem of a lower dispersion tolerance and reduced spectral efficiency.

In view of these known schemes an object of the present invention is to propose an improved modulation format capable of overcoming the problems associated with the prior art.

A particular object of the present invention is to propose a modulation format that is capable of effectively combating the influence of non-linear pulse-to-pulse interactions, which is the dominating non-linear effect in optical fiber transmission at bit rates of 40 Gbit/s and above.

SUMMARY OF INVENTION

The above objects are achieved in an apparatus for transmitting an optical signal that includes a light source for generating an optical signal and a data modulator coupled to the light source for modulating data onto the optical signal at a predetermined bit rate. The resulting data encoded optical signal is then phase modulated by at least one phase modulator coupled to the data modulator. The phase modulator is arranged to modulate the phase of the data encoded optical signal at a frequency that is 1/n of the predetermined bit rate, where n is an integer greater than 2.

The application of a phase modulation at a frequency of a third or less of the bit rate of a digital data signal increases the non-linear tolerance of a transmission system by reducing the effect of non-linear pulse-to-pulse interactions. Moreover, this increase in non-linear tolerance is surprisingly significantly better than that obtained by a phase modulation at one half of the data bit rate. In particular the effect of IFWM, where spectral components are mixed in a single channel and lead to the generation of pulses in zero bit-slots and amplitude variations, is strongly reduced by virtue of the phase modulation in accordance with the present invention. The ability to achieve this level of improvement at a frequency that is so much lower than the data bit rate also renders the transmitter arrangement simpler and therefore cheaper than prior art devices.

A particularly advantageous result is obtained when phase modulation is performed using a waveform having a frequency of ¼ of the data bit rate. The increase in complexity of the receiver is minimal when the waveform used for the phase modulation is sinusoidal waveform, although the advantageous improvement in transmission performance attainable with the present invention can also be achieved using other waveforms including a square wave.

Further advantageous embodiments are set out in the dependent claims.

The invention further resides in a transmission system including a transmitter as described above, a wavelength division multiplexed (WDM) transmission system including a transmitter as described above and in a method as defined in the claims.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION OF THE DRAWINGS

Figure 1:
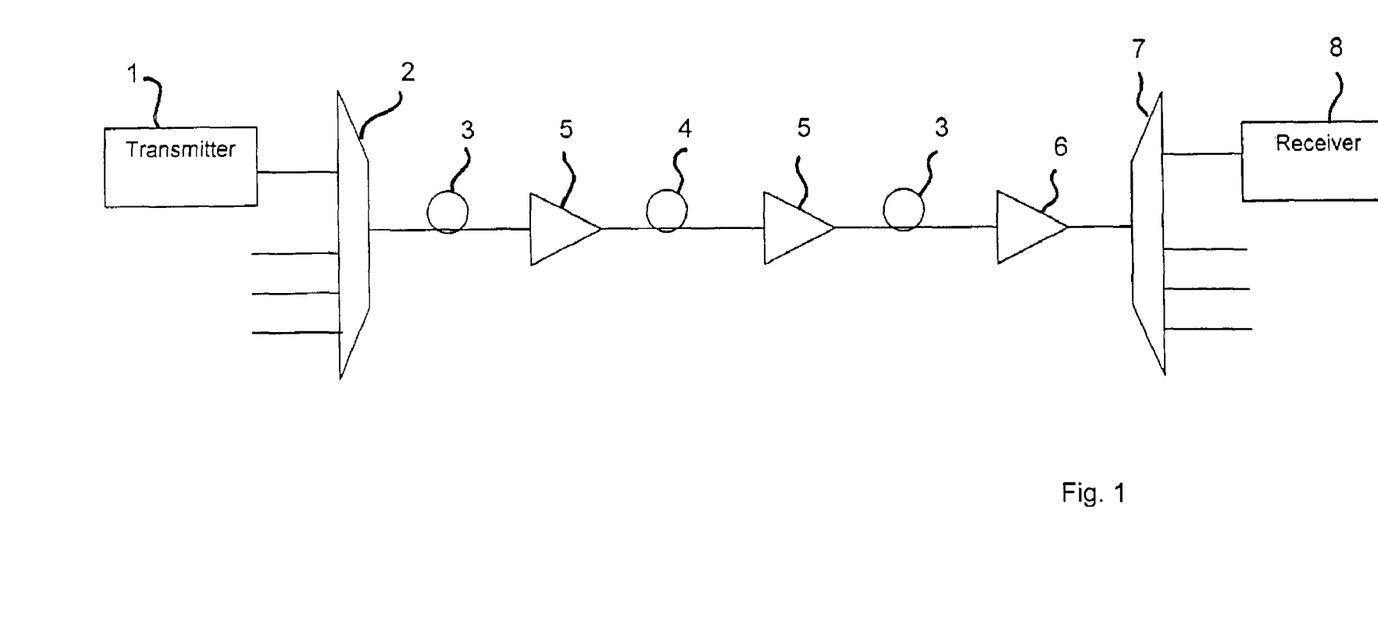
FIG. 1 schematically illustrates a transmission system in accordance with the present invention.

Referring now to FIG. 1, there is shown a block diagram of the overall configuration of a wavelength division multiplexed (WDM) optical transmission system. Optical signals are transmitted from several optical transmitters 1, only one of which is illustrated in the figure. In accordance with the present invention, this transmitter 1 generates signals at a data rate of 40 Gbit/s. The signals are multiplexed with signals generated by other optical transmitters at different channel wavelengths in a multiplexer 2 onto an optical fibre 3. This fibre is preferably a single mode fibre (SMF) and preferably includes dispersion compensation optical fibre 4 (DCF) to compensate for the average dispersion along the line. Optical amplifier repeaters 5 are arranged along the transmission path and a preamplifier 6 is arranged upstream of a demultiplexer 7, which separates the channels and send each channel to a receiver 8. For the sake of simplicity, only one receiver is illustrated in FIG. 1.

Figure 2:
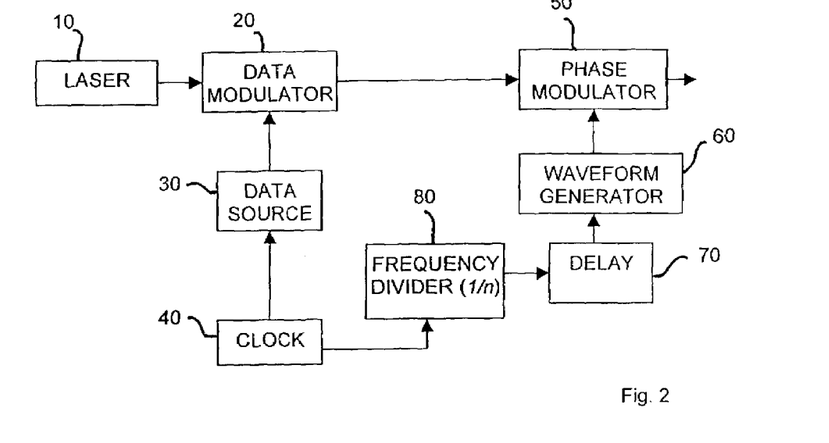
FIG. 2 shows a schematic of an optical transmitter in accordance with a first embodiment of the present invention, FIG. 3 schematically depicts an experimental set-up used to determine the performance of a transmitter in accordance with the present invention.

An optical transmitter according to a first embodiment of the present invention is illustrated schematically in FIG. 2. The transmitter includes a continuous wave (CW) light source 10, such as a laser or laser diode, which generates an optical signal at the required carrier frequency. This light source 10 is preferably a distributed feedback laser (DFB) operating in the 1550 nm wavelength band. The continuous wave optical signal is then modulated by a first data modulation. This is achieved using a data modulator 20 coupled to the light source. The data modulator 10 is connected to a data source 30, which in turn is connected to a clock 40, which generates a 40 GHz clock signal. The data modulator 20 thus receives data at a frequency determined by the clock 40 from the data source 30 and modulates or encodes the continuous wave with this information to form a modulated optical data signal. The data modulator 20 generates encoded return-to-zero (RZ) with information from the data source. In FIG. 2, the data modulator 20 is represented schematically as a single unit. It will be understood that in practice the modulator includes two modulator stages for generating encoded RZ, a first modulator for converting the continuous wave optical signal into a repeating 40 GHz return-to-zero optical pulse sequence, and a second modulator encoding these RZ pulses with digital information to form a data signal with bit rate of 40 Gbit/s. Naturally if the data modulator 20 were configured for non-return-to-zero (NRZ) format, only one modulating stage would be required. The data modulator may be an electro-optic modulator such as a Mach-Zehnder modulator on lithium niobate ($LiNbO_3$) or an electro-absorption modulator. The present embodiment uses the RZ modulation format, however, as will be described in more detail below, the configuration of the transmitter according to the present invention may equally be used for NRZ modulation format. The clock 40 is also coupled to a frequency divider 80, which divides the clock frequency by an integer n, where n is an integer >2. In accordance with a preferred arrangement, the integer n is 4, such that the frequency divider generates a clock signal that is one quarter of the frequency used to encode the data, that is 10 GHz. The frequency divider 80 is in turn connected to a delay element 70 that imposes a delay on the slower clock signal. The delay element 70 is connected to a waveform generator 60, which generates a waveform for driving a phase modulator 70. The phase modulator 70 is of conventional type well known in the art, typically an electro-optical phase modulator on lithium niobate ($LiNbO_3$). It modulates the phase of the encoded data signal at a frequency of 1/n of the bit rate imposed by the data modulator (where n is an integer>2), and preferably one quarter of the bit rate, that is at 10 GHz in the preferred embodiment. The phase difference imposed by the phase modulator 50 is determined by the delay element 70. The waveform generated by the generator 70 may be sinusoidal, a square wave or any arbitrary waveform. The delay element 60 is preferably arranged to permit the delay to be adjusted to obtain the optimum transmission performance, in terms of non-linearity tolerance, for any given waveform and data rate. It should be understood that under some conditions a delay of zero will produce the optimum transmission performance, so that no delay element is required. The amplitude of the waveform produced by generator 70 is also set at a level that produces optimal transmission performance.

In the embodiment of FIG. 2, the clock 40 generates the data bit rate and is used to drive the data source 30. It will be appreciated that the clock could alternatively be used to drive the phase modulator 50 via a delay element 70 and waveform generator 60 and a frequency multiplier using a multiplication of n, where n is an integer >2, provided to generate the required data frequency.

Figure 3:
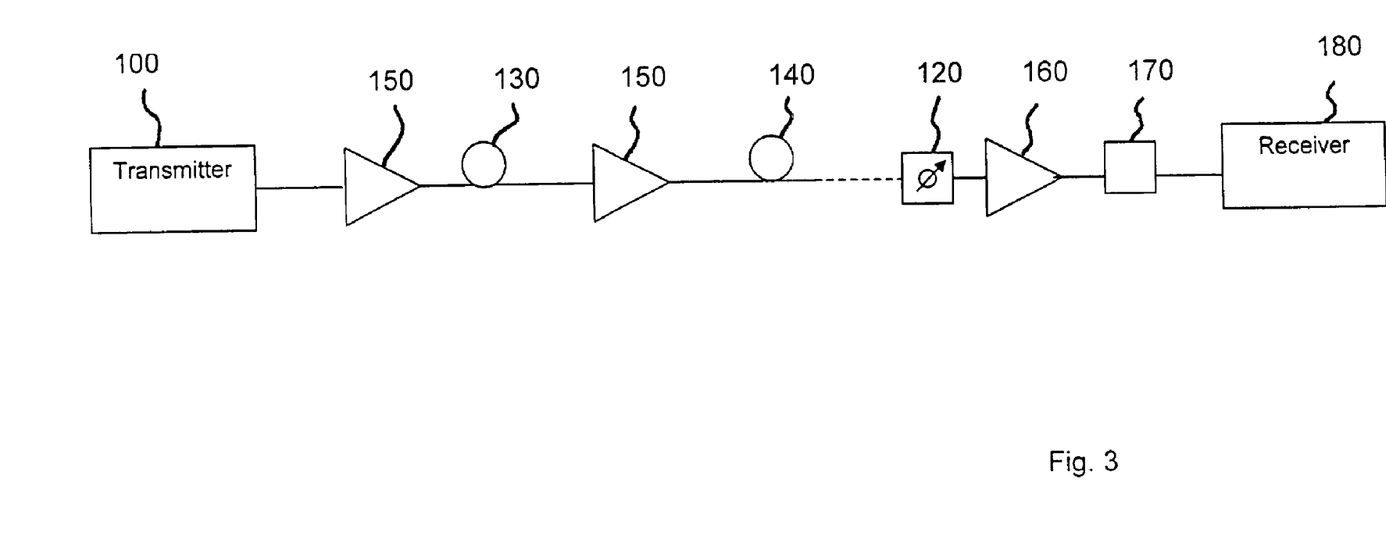

Referring now to FIG. 3 there is shown an experimental model of a transmission link for simulating and assessing the performance of the transmitter of FIG. 2. This model consists of a transmitter 100, which corresponds to the transmitter described with reference to FIG. 2, a transmission line comprising eight spans, each having 80 km of G.652 single-mode fiber (SMF) 130, a dispersion compensation fiber (DCF) 140 to bring the average dispersion in each span to zero and optical amplifier repeaters 150. At the end of the line is arranged a variable attenuator 120, an optical preamplifier 160, a band-pass filter 170 and a receiver 180. The transmitter 1 launches a 512 bit 40 Gbit/s random data sequence on an optical carrier signal using RZ modulation format with 8 ps full-wave-half-maximum (FWHM) pulse width. The optical signal is also phase modulated at 10 GHz (¼ of the bit rate). The waveform driving the phase modulator is sine wave with a peak to-peak amplitude of 150°.

The output powers of the optical amplifier repeaters 150 before each stretch of SMF 130 and DCF 140 are +6 dBm and 0 dBm, respectively. To simplify the assessment of the non-linear tolerance of the transmission link, these amplifiers are assumed to be noiseless. The preamplifier 160 has a noise figure of 5 dB. The band-pass filter 170 is centered on the carrier frequency with a bandwidth of 160 GHz, and the receiver 180 includes an electrical fourth order Bessel filter with a bandwidth of 30 GHz.

The transmission performance was measured by determining the signal power at the input to the preamplifier necessary to achieve a bit-error rate (BER) of $10^{-9}$ and calculating the power penalty compared to back-to-back transmission, that is, transmission directly from the transmitter and receiver without intervening fibers.

Figure 4:
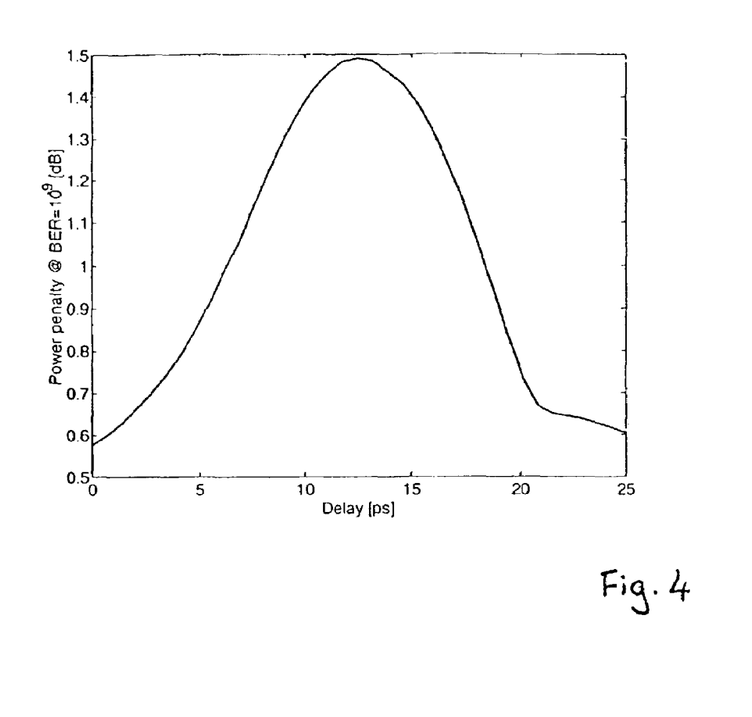
FIG. 4 shows a graph of power penalty verses delay for the arrangement of FIG. 4, FIGS. 5, 6 show graphs of optical power and phase for different delays in the arrangement of FIG. 5.
Figure 5:
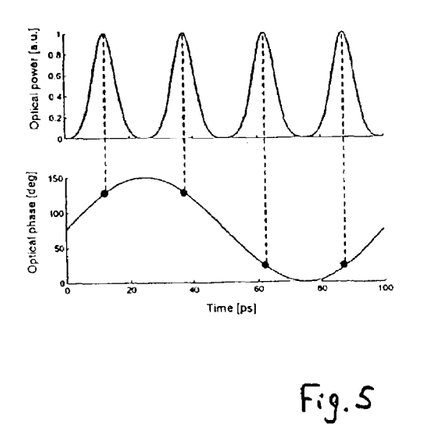
Figure 6:
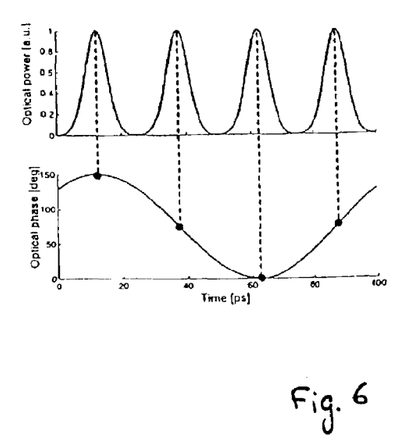

As a first adjustment to optimise the transmitter for optimised transmission performance the delay imposed by the delay element 70 in FIG. 2 was adjusted to vary the delay of the phase modulating waveform relative to the data signal output by the data modulator 20. FIG. 4 shows a graph of power penalty as a function of this delay. It can be seen from FIG. 4 that transmission performance is worst with a delay of 12.5 ps, while the lowest power penalty, and thus optimal transmission performance can be obtained with a delay of 0. It should be noted that a delay of 25 ps does not affect the transmission performance, since this effectively corresponds to a phase shift of one bit-slot. The relative performance with a delay of 0 and 12.5 ps is illustrated further in FIGS. 5 and 6, which show graphs of optical power and phase. FIG. 5 illustrates the correlation between the optical pulse train and phase for a delay of 0. FIG. 6 shows the same graphs for the case when the delay is 12.5 ps. In FIG. 5, the phase of consecutive pulses in each group of four can be logically represented by the letters "A, A, B, B", where A and B represent clearly distinguishable phases. Using the same notation for the case shown in FIG. 6, the phase could be represented as "A, 0, −A, 0". The latter pattern has been found to be inferior in transmission performance than the former. In other words, for the conditions mentioned above i.e. 40 Gbit/s RZ modulation with 8 ps FWHM pulse width and a sinusoidal waveform with peak-to-peak amplitude of 150° driving the phase modulator 50 a delay of zero provides the best transmission performance. It has been determined that the same logical phase pattern shown in FIG. 5 can also be obtained using a 10 GHz square wave to drive the phase modulator 50 in place of a sine wave.

Figure 7:
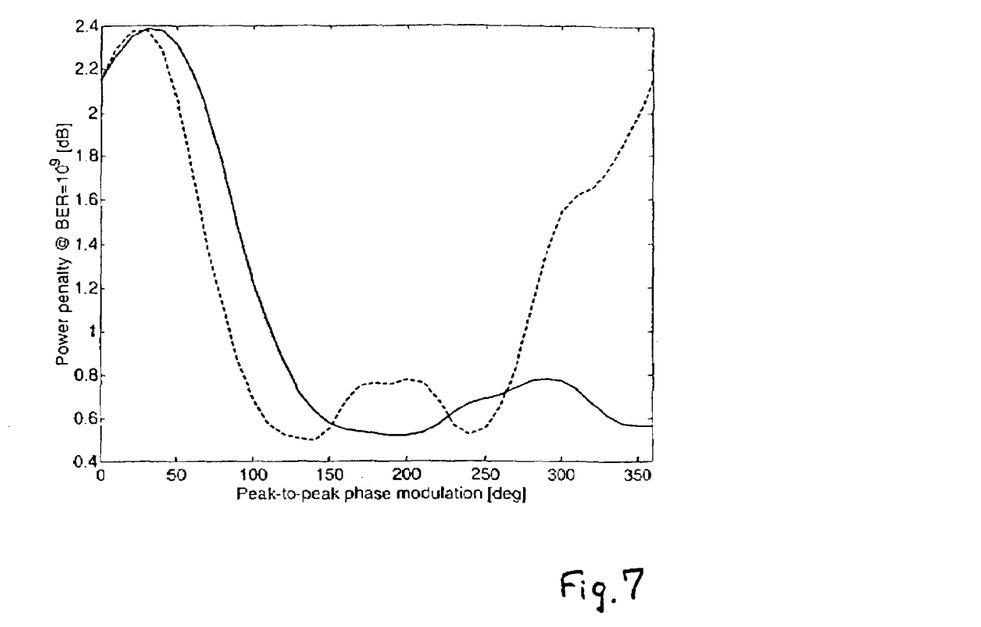
FIG. 7 shows a graph of power penalty verses peak-to-peak phase modulation for a sinusoidal and square wave.

The second adjustment for optimising transmission performance in terms of non-linear effects is the amplitude of the waveform used to drive the phase modulator 50. FIG. 7 shows a graph illustrating the power penalty verses peak-to-peak phase modulation in degrees. Two cases are illustrated in this graph; a sinusoidal driving waveform is illustrated with a solid line and an ideal square wave is illustrated with a dashed line. It can be seen that the lowest power penalty, i.e. the optimum transmission performance in terms of the non-linear tolerance, is obtained at around 200° for a sinusoidal waveform and at around 140° for an ideal square wave. Setting the peak-to-peak phase modulation at 150° would permit acceptable performance to be obtained with either waveform. The optimum performance corresponds to a reduction in power penalty compared with pure RZ (i.e. with zero phase modulation) of about 1.6 dB. This is a significant improvement in transmission performance due to the suppression of non-linear pulse-to-pulse interactions achieved by a phase modulation at 1/n of the bit rate, where n is an integer >2.

Figure 8:
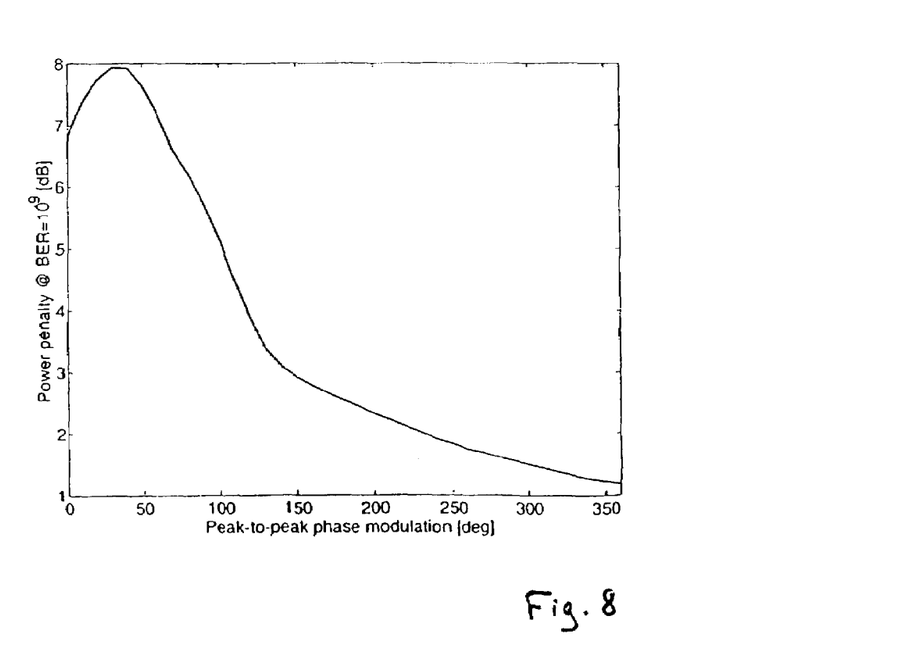
FIG. 8 shows a graph of power penalty verses peak-to-peak phase modulation for NRZ modulation format.

The phase modulation used in the transmitter of FIG. 2 is also applicable to transmitters using the non-return-to-zero (NRZ) transmission format. This is illustrated in FIG. 8, which shows a graph of power penalty verses peak-to-peak phase modulation with a sinusoidal waveform driving the phase modulator 50 for NRZ data modulation. In this case the length of the transmission line was reduced from 8 spans to 4 spans, as NRZ modulation has a lower tolerance to fiber non-linearity than the RZ modulation format. It can be seen that a reduction in power penalty of 3.7 dB relative to the case with no phase modulation is obtained for a peak-to-peak modulation of 140°, which indicates that the transmission performance improvement is even more significant for the NRZ than for the RZ modulation format.

The phase modulation at a frequency equal to 1/n of the data bit rate, where n is an integer >2, may be applied to transmitters that already incorporate phase modulation. In this way, the non-linear tolerance of chirped RZ modulated data, carrier suppressed RZ data or alternative chirped RZ data, for example, is further enhanced. For such an arrangement, the data modulator 20 in the receiver of FIG. 2 would be replaced by a combined data and phase modulator generating the known modulation formats, that is with a phase modulator driven by a waveform that is synchronised with the data bit rate or to twice the bit rate, as appropriate. The supplementary phase modulation at 1/n of the data bit rate (where n is an integer >2) is then applied using the phase modulator 50 in accordance with the present invention. In essence therefore, the transmission performance of existing transmission links using conventional RZ, NRZ, CRZ, CS-RZ and alternative chirped RZ modulators can be significantly improved by the simple addition of a phase modulator operating at 1/n of the data bit rate, where n is an integer >2.

Figure 9:
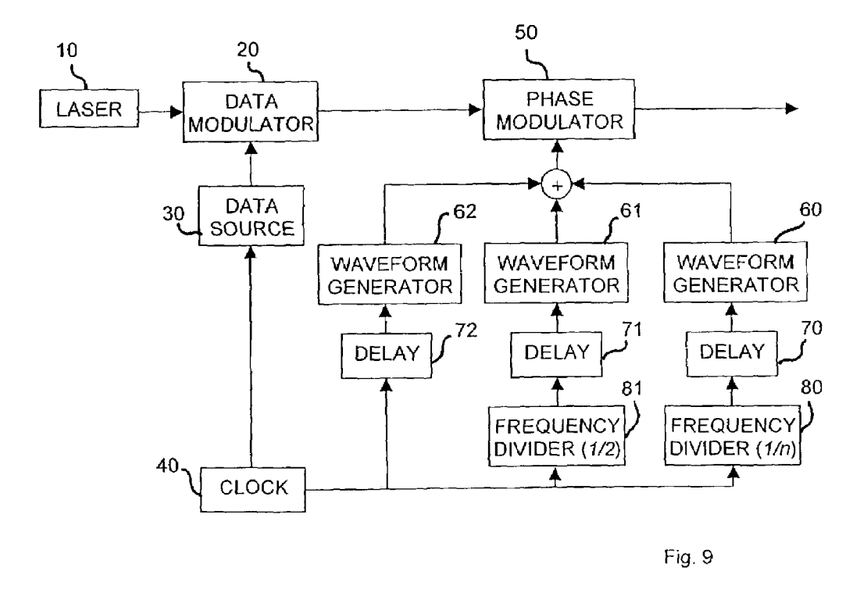
FIG. 9 shows a schematic of an optical transmitter in accordance with a second embodiment of the present invention.

As has been illustrated with reference to FIGS. 3 to 7, a significant improvement in non-linear tolerance for data transmission at 40 Gbit/s can be achieved using phase modulator driven by a simple sinusoidal waveform with amplitude of 150° and with zero delay. In an alternative embodiment, a single phase modulator can be driven by waveforms at fundamental frequencies of 1/n of the bit rate (where n is an integer >2) combined with signals at higher frequencies. Such an arrangement is illustrated in FIG. 9. In the arrangement shown in FIG. 9 the elements already described with reference to FIG. 2 carry the same reference numerals. Thus the transmitter of FIG. 9 includes a continuous wave light source 10 a data modulator 20 coupled to the light source and driven by a clock 40 and data source 30 in the same way as the transmitter shown in FIG. 2. A phase modulator 50 is also coupled to the data modulator 20 for imparting a phase modulation to the encoded optical signal. This arrangement differs from the transmitter of FIG. 2 in that the phase modulator 50 is not driven by signals from a single waveform generator but by several waveform generator signals combined in a mixer 90. Each waveform generator 60, 61, 62 is connected at the output to the mixer 90. The waveform generators 60, 61, 62 may be configured to generate the same waveform shape and amplitude or alternatively one or more may generate different waveforms. The generators 60, 61, 62 each receive clock signals from the clock 40 via a respective delay element 70, 71, 72. In the exemplary embodiment, one of the waveform generators 62 receives the clock signal directly from the clock 40. A second waveform generator is driven by a clock frequency that is half the frequency of the signal generated by the clock

40. To this end a frequency divider is arranged between the clock 40 and delay element 71. The third waveform generator 60 receives a clock signal that has 1/n of the frequency of the clock signal generated by the clock 40, where n is an integer >2. To this end a frequency divider 80 is provided between the clock 40 and the delay element 70. While in this arrangement the phase modulator 50 modulates the phase of the optical information signal using waveforms from only three waveform generators, it will be understood that more or fewer waveform generators may be used, provided that at least one generates a waveform at 1/n of bit rate (where n is an integer >2) of the optical information signal. In the illustrated embodiment the frequency divider 80 preferably divides the clock frequency by four, so that the phase modulator 50 is driven by a combination of waveforms at frequencies of 40 GHz, 20 GHz and 10 GHz. As for the transmitter of FIG. 2, the delay imposed by the delay elements 70, 71, 72 and the amplitude of the waveforms generated by the waveform generators 60, 61, 62 are adjusted to optimise the transmission performance. These adjustments may result in different delays and amplitudes for each waveform generator 60, 61, 62 depending on the waveform used.

In the transmitters of FIGS. 2 and 9 the continuous wave optical signal from the light source 10 is subjected first to data modulation with data modulator 20 and then to phase modulation. It will be understood, however, that the order of application of the data and phase modulations to the continuous wave optical signal may equally be reversed without altering the signal format and the attendant improvement in non-linear tolerance.

The invention claimed is:

1. An apparatus for transmitting an optical signal including:
   a light source for generating an optical signal and
   a data modulator arranged to modulate data onto said optical signal at a predetermined bit rate to generate a data encoded optical signal wherein at least one phase modulator is coupled to one of said data modulator and said light source for modulating the phase of said data encoded optical signal or said optical signal, respectively, at a frequency that is 1/n of said predetermined bit rate, where n is an integer greater than 2.

2. An apparatus as claimed in claim 1, further including a waveform generator coupled to said phase modulator, wherein said waveform generator is arranged to generate a sinusoidal signal with a frequency equal to 1/n said predetermined bit rate.

3. An apparatus as claimed in claim 1, further including a waveform generator coupled to said phase modulator, wherein said waveform generator is arranged to generate a square wave signal with a frequency equal to 1/n said predetermined bit rate.

4. An apparatus as claimed in claim 1, wherein a data source is coupled to said data modulator,
   a clock is coupled to said data modulator for generating a clock signal at said predetermined bit rate and
   a frequency divider is coupled between said clock and said phase modulator for generating a clock signal equal to 1/n of said predetermined bit rate.

5. An apparatus as claimed in claim 4, further including a delay element coupled between said clock and said waveform generator for generating a delay.

6. An apparatus as claimed in claim 5, wherein said delay element is arranged to produce an adjustable delay.

7. An apparatus as claimed in claim 1, further including at least one further phase modulator coupled between said data modulator and said phase modulator, said further phase modulator being arranged to modulate the phase of said data encoded optical signal at a frequency equal to the predetermined bit rate.

8. An apparatus as claimed in claim 1, further including at least two waveform generators coupled to said phase modulator, at least one of said waveform generators being arranged to generate a sinusoidal signal with a frequency equal to 1/n said predetermined bit rate, where n is an integer >2.

9. An apparatus as claimed in claim 8, further including a mixer arranged between said waveform generators and said phase modulator.

10. An apparatus as claimed in claim 1, wherein n is equal to 4.

11. An apparatus as claimed in claim 1, wherein said data modulator is arranged to generate return-to-zero modulated data signals.

12. An apparatus as claimed in claim 1, wherein said data modulator generates non-return-to-zero modulated data signals.

13. An optical transmission system, including
   an optical transmitter for generating optical data signals for transmission,
   a transmission line comprising optical fibers coupled to said optical transmitter for receiving and transmitting said optical data signals, and
   an optical receiver coupled to said transmission line for receiving said optical data signals, wherein said optical transmitter includes a light source for generating an optical signal,
   a data modulator arranged to modulate data onto said optical signal at predetermined bit rate to generate a data encoded optical signal at least one phase modulator coupled to one of said data modulator and light source for modulating the phase of said data encoded optical signal or said optical signal, respectively, at a frequency that is 1/n of said predetermined bit rate, where n is an integer greater than 2.

14. A system as claimed in claim 13, further including a delay element coupled between said clock and said waveform generator for generating a delay.

15. A system as claimed in claim 14, wherein said delay element is arranged to produce an adjustable delay.

16. A system as claimed in claim 13, wherein said data modulator is arranged to generate return-to-zero modulated data signals.

17. A system as claimed in claim 13, wherein said data modulator is arranged to generate non-return-to-zero modulated data signals.

18. A wavelength division optical transmission system, including
   a plurality of optical transmitters, each transmitter being arranged for generating optical data signals at a different channel wavelength for transmission,
   a transmission line comprising optical fibers coupled to said optical transmitters for receiving and transmitting said optical data signals,
   a plurality of optical receivers coupled to said transmission line, each optical receiver being arranged to receive optical data signals at said different channel wavelengths, wherein at least one optical transmitter includes a light source for generating an optical signal
   a data modulator arranged to modulate data onto said optical signal at predetermined bit rate to generate a data encoded optical signal, at least one phase modulator coupled to one of said data modulator and said light source for modulating the phase of said data encoded optical signal or said optical signal, respectively, at a frequency that is 1/n of said predetermined bit rate, where n is an integer greater than 2.

19. A method of modulating an optical signal, including:

generating a continuous wave optical signal, superimposing data on said continuous wave signal at a predetermined bit rate to generate an encoded optical signal, phase modulating one of said encoded optical signal and said continuous wave optical with a waveform having a frequency of 1/n of said predetermined bit rate, where n is an integer >2.

20. A method as claimed in claim 19, further including the step of:

delaying the phase of said waveform relative to said predetermined bit rate by a delay adjusted to obtain optimal power penalty for a given bit error rate.

21. A method as claimed in claim 19, further including the step of: adjusting the amplitude of said waveform to obtain optimal power penalty for a given bit error rate.

22. A method as claimed in claim 19, wherein said step of superimposing data is performed using return-to-zero modulation format.

23. A method as claimed in claim 19, wherein said step of superimposing data is performed using non-return-to-zero modulation format.

* * * * *